(12) United States Patent
Meng et al.

(10) Patent No.: US 11,921,984 B1
(45) Date of Patent: Mar. 5, 2024

(54) EPHEMERAL DIGITAL CONTENT RECOMMENDATIONS

(71) Applicant: Meta Platforms, Inc., Menlo Park, CA (US)

(72) Inventors: Siping Meng, Newark, CA (US); Igor Glotov, Mountain View, CA (US); Tiffany Hoi Ching Loo, Jurupa Valley, CA (US); Reza Zangeneh, Burnaby (CA)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 18/094,262

(22) Filed: Jan. 6, 2023

(51) Int. Cl.
*G06F 3/048* (2013.01)
*G06F 3/0482* (2013.01)
*H04L 51/216* (2022.01)
*H04L 51/52* (2022.01)

(52) U.S. Cl.
CPC .......... *G06F 3/0482* (2013.01); *H04L 51/216* (2022.05); *H04L 51/52* (2022.05)

(58) Field of Classification Search
None
See application file for complete search history.

(56) References Cited

U.S. PATENT DOCUMENTS

| 2013/0325948 | A1* | 12/2013 | Chen | H04L 67/535 709/204 |
| 2019/0190869 | A1* | 6/2019 | Peiris | G06Q 50/01 |
| 2019/0335014 | A1* | 10/2019 | Armstrong | H04L 65/403 |
| 2021/0117050 | A1* | 4/2021 | Lewbel | H04L 65/403 |

* cited by examiner

*Primary Examiner* — Thanh T Vu
(74) *Attorney, Agent, or Firm* — McDermott Will & Emery LLP

(57) ABSTRACT

Systems, methods, and non-transitory computer readable media are configured to perform operations comprising determining a list of contacts of a user of an application; identifying a contact in the list of contacts that has posted a content item that is accessible to the user; and causing, through an interface of the application, presentation of the contact in the list of contacts with an indication that the content item is accessible to the user.

20 Claims, 11 Drawing Sheets

360

380

EPHEMERAL DIGITAL CONTENT RECOMMENDATIONS

FIELD OF THE INVENTION

The present technology relates to the field of digital content. More particularly, the present technology relates to digital content delivery through a communications platform.

BACKGROUND

People can utilize computing devices for a wide variety of purposes. For example, users can utilize computing devices to access a content sharing platform (e.g., social networking system) or a communications platform (e.g., messaging system). The users can utilize the computing devices to interact and communicate with one another in a variety of manners. For example, the computing devices can run an application associated with a selected platform to access content of other users.

SUMMARY

Various embodiments of the present technology can include systems, methods, and non-transitory computer readable media configured to perform operations comprising determining a list of contacts of a user of an application; identifying a contact in the list of contacts that has posted a content item that is accessible to the user; and causing, through an interface of the application, presentation of the contact in the list of contacts with an indication that the content item is accessible to the user.

In some embodiments, the content item is an ephemeral content item.

In some embodiments, the indication is an element in a predetermined position in relation to an identifier of the contact.

In some embodiments, the element has a geometric shape that is displayed in a first color when the content item has not been consumed by the user and displayed in a second color when the content item has been consumed by the user.

In some embodiments, the presentation of the contact includes an avatar associated with the contact, and selection by the user of at least one of the avatar or the indication causes provision of the content item.

In some embodiments, the presentation of the contact includes a name of the contact, and selection by the user of the name causes provision of a message thread between the user and the contact.

In some embodiments, the contact appears in a first predetermined segment of the listing of contacts that only contains contacts with content items that are accessible to the user.

In some embodiments, the contact is associated with a score, and the contact appears in the listing of contacts at a position that is higher than a position of a second contact associated with a higher score, the second contact not having a content item that is accessible to the user.

In some embodiments, an adjusted score is generated for the contact based on application of a coefficient to a score associated with the contact, the contact appearing in the listing of contacts based on the adjusted score.

In some embodiments, the indication is part of a combined indication that the contact has a content item that is accessible to the user and that the contact is currently using the application.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the present technology.

Figure 1:
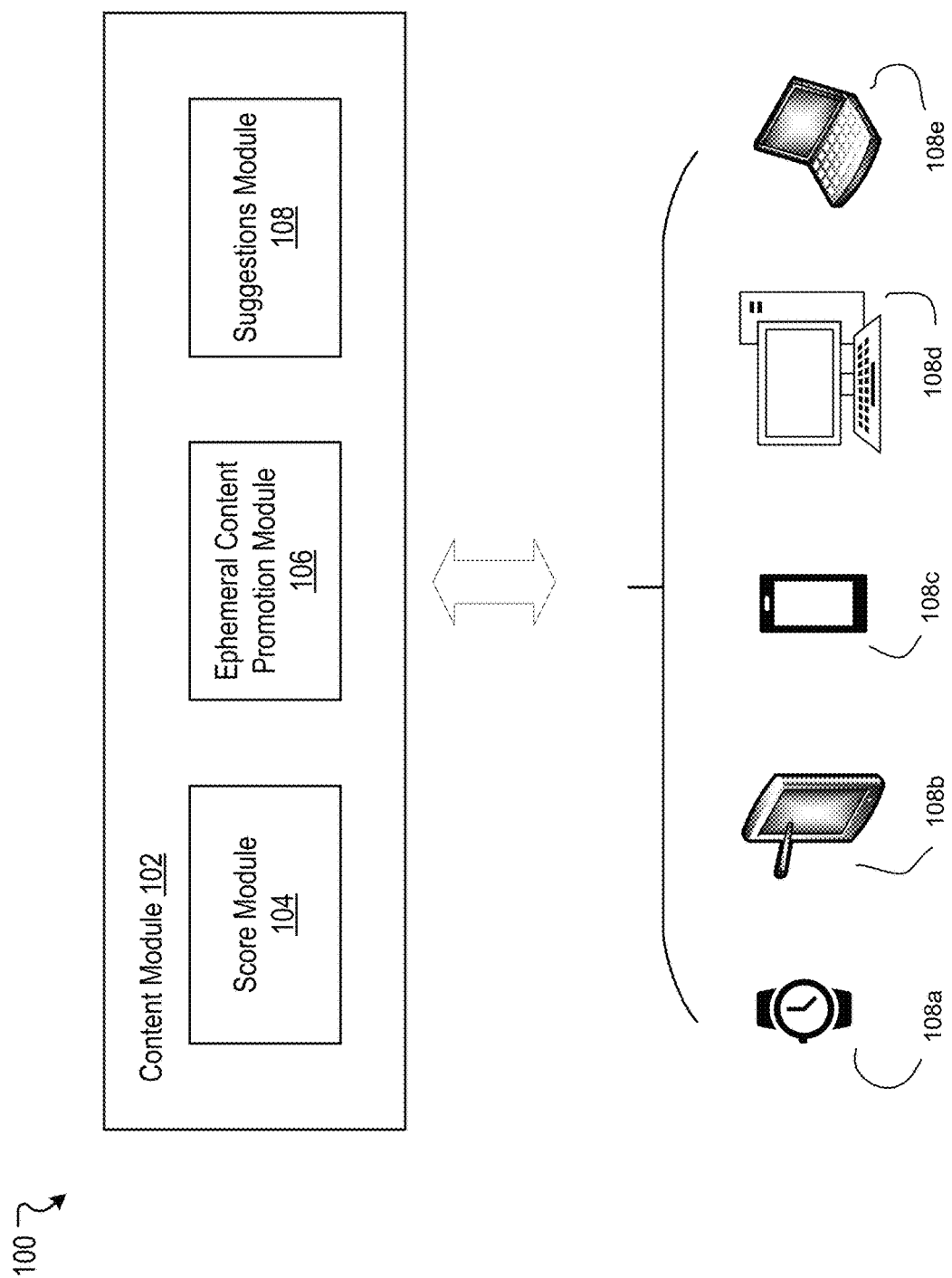
FIG. 1 illustrates an example system including a content module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Today, people can utilize computing devices for a wide variety of purposes. For example, users can utilize computing devices to access a content sharing platform (e.g., social networking system) or a communications platform (e.g., messaging system). The users can utilize the computing devices to interact and communicate with one another in a variety of manners. For example, the computing devices can run an application associated with a selected platform to allow the exchange of messages between users.

In conventional techniques, an application associated with a communications platform can support messaging between or among users. By utilizing the application, a user can connect with contacts and conduct various types of communications with the contacts. For example, the various types of communication can include instant messaging, audio calls, video calls, and the like. However, a conventional application may be limited in informing the user about the full spectrum of activities in which the contacts of the user are engaged. The activities can include, for example, the posting of content by a contact. Further, a conventional application may not allow the user to conduct communications or otherwise interact with the contacts or the various activities in which the contacts are engaged. Accordingly, conventional techniques can limit the ability of the user to be informed about the activities of their contacts. As a result, conventional techniques can undesirably constrain the scope of potential communications and interactions that the user can conduct with the contacts and their activities.

An improved approach rooted in computer technology overcomes the foregoing and other disadvantages associated with conventional approaches specifically arising in the realm of computer technology. In various embodiments, the present technology can receive scores for a plurality of contacts of a user. Each score for a contact can reflect a probability that the user will interact with the contact. Whether the contacts have posted a content item, such as an ephemeral content item (e.g., Story), that is accessible to the user can be determined. Contacts who have posted ephemeral content items that are still accessible to the user can be promoted to increase the likelihood that they are included in a list of contacts who are suggested to the user. A variety of techniques can be used to generate the list. In a first technique, a predetermined number of contacts who have posted ephemeral content items that are accessible to the user and who have the highest scores can be determined. The predetermined number of contacts can be included in a particular segment of the list. In a second technique, scores of contacts who have posted ephemeral content items that are accessible to the user can be adjusted to have higher values. For example, the adjustment can involve application (e.g., multiplication) of a selected coefficient to each score for a contact who has posted ephemeral content items that are accessible to the user. The adjusted scores of the contacts who have posted ephemeral content items that are accessible to the user can be used to position the contacts in a ranking of a larger number of contacts. When contacts who have posted ephemeral content items that are accessible to the user have adjusted scores that position the contacts sufficiently high in the ranking, the contacts can be included in the list.

The list can be presented through an interface of an application running on the computing devices of the user and contacts of the user to allow communication among them. Each contact included in the list can be presented with a dedicated section. A predetermined portion of a section associated with a contact can include an indication to the user that an ephemeral content item of the contact is available to access. As just one example, the indication can be a ring around an avatar of the contact. When the predetermined portion of the section is selected by the user, the ephemeral content item of the contact can be presented to the user. An interface through which the ephemeral content item is presented can allow the user to generate a message in relation to the ephemeral content item or react to the ephemeral content item with emojis. As a result, the present technology provides a rich experience for the user to seamlessly initiate conversations and communications with contacts in relation to their ephemeral content items. After consumption of the ephemeral content item, the predetermined portion of the section associated with the contact can include a changed indication. For example, the changed indication can be a modification to the ring around the avatar of the contact. The changed indication can indicate to the user that the ephemeral content item has been consumed by the user. More details relating to the present technology are provided herein.

FIG. 1 illustrates an example system 100 including a content module 102, according to an embodiment of the present technology. The content module 102 can inform a user about the accessibility of content items associated with contacts of the user. The content module 102 also can provide access to the content items and can allow the user to interact with the content items. The content items can include various types of videos, audio, images, etc. In some embodiments, the content module 102 can indicate to the user the availability of ephemeral content items (e.g., an ephemeral video, a Story) posted by contacts of the user and allow the user to consume (e.g., view) the ephemeral content items while they are accessible to the user.

In some embodiments, the system 100, including the content module 102, can be implemented on a server system that is in communication over a communications network with client computing devices 108a, 108b, 108c, 108d, 108e of various users. In some embodiments, the client computing devices 108 can include or be implemented with a user device 610, as discussed in relation to FIG. 6. In some embodiments, some or all of the functionality of the content module 102 can be performed by a server of the system 100. In some embodiments, some or all of the functionality of the content module 102 can be performed by an application running on the client computing devices 108. In some embodiments, the functionality of the content module 102 can be distributed between a server of the system 100 and an application running on the client computing devices 108. The system 100 can be associated with a suitable platform or system. For example, the system 100 can be implemented by a communication platform or system, such as a messaging system. Although a particular type of system may be referenced in various examples discussed herein, the present technology applies to any type of messaging platform or system, social networking platform or system, content sharing platform or system, or the like. In some instances, the system 100 can include at least one data store (not shown) in communication with the content module 102. The data store can maintain information required to support operation of the system 100 and the content module 102. For example, the data store can maintain information about contacts of a user and scores relating to the contacts. As another example, the data store can maintain data regarding ranking of the contacts based on their scores, contacts that have posted ephemeral content items that are accessible to the user, adjusted scores of contacts, positions of contacts in a listing of suggested contacts for presentation to the user, state information regarding whether ephemeral content items have been consumed by the user, and other data supportive of operation of the content module 102.

The client computing devices 108a, 108b, 108c, 108d, 108e can be, for example, any combination of mobile devices and non-mobile devices, such as smart-phones, laptops, tablets, desktop computers, watches, etc. Each of the client computing devices 108a, 108b, 108c, 108d, 108e can include one or more applications running on the client computing device 108 and having functionality to support or perform the functionality of the present technology. An application on the client computing devices 108 can include an interface that is presented through a screen of the client computing device 108. A user of the client computing device 108 can interact with the application through appropriate inputs and commands (e.g., touch gestures) applied to the screen through which the interface of the application is presented. Among other capabilities, the application can allow a user to perform a search of contacts of the user. The interface of the application can provide a search utility (e.g., search bar) through which the user can enter keywords to perform searches. Upon positioning of a cursor in the search bar, the interface can include a listing of contacts for whom the user has recently searched. The contacts can be represented by display of associated avatars in the interface. The interface also can include a listing of suggested contacts that are predicted to be the particular contacts with whom the user is most likely to communicate or interact. The listing of suggested contacts reflects the predicted intent of the user to communicate with certain others. The listing of suggested contacts can include contacts who have posted a certain type of content item, such as an ephemeral content item, that is currently accessible to the user at the time the user is utilizing the application. In the listing of suggested contacts, the accessibility of an ephemeral content item of a contact can be conveyed through a displayed indication. For example, the indication can be a ring around the avatar of the contact. Selection by the user of the avatar or the ring around the avatar can cause the ephemeral content item to be presented to the user. After consumption of the ephemeral content item by the user, the indication can be changed to convey that the ephemeral contact item of the contact has been consumed by the user. As mentioned, the listing of suggested contacts can be presented as part of a search surface of the application. In some embodiments, the listing of suggested contacts can be accessed from a variety of different surfaces and entry points of the application.

The content module 102 can include a score module 104, an ephemeral content promotion module 106, and a suggestions module 108. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the content module 102 can be implemented in any suitable combinations.

The score module 104 can determine a plurality of contacts of a user. Each contact of the plurality of contacts can be associated with a score or value. In general, a score associated with a contact can be based on a degree of affinity or connectedness between the user and the contact on a communications system or platform or a social networking system or platform. In some embodiments, the score can represent an extent or degree to which a user intends to communicate or otherwise interact with the contact or content items posted by the contact. The score can be based on a variety of considerations. As just some examples, the score can be based on prior communications and interactions between the user and the contact, user profile information of the user and the contact, common interests of the user and the contact, activities of common connections of the user and the contact, etc. Many other considerations are possible. Considerations on which the score is based can be reflected in a social graph describing various aspects of connections and interactions among entities in a communications system or social networking system. In some embodiments, the score associated with a contact of the user can be predetermined and already known for supporting different functionality of a communication system or a social networking system that is independent or separate from the functionality of the content module 102 in accordance with the present technology.

In some embodiments, the score associated with a contact is not based on and otherwise does not account for whether a user has consumed (e.g., viewed) some or all of an ephemeral content item of the contact. In this regard, the score for a contact can be independent of factors of a dynamic nature that could cause fluctuations in the score and thereby result in undesirable movements in the position of the contact within a ranking of all contacts based on their scores or adjusted scores as discussed in more detail herein. In some embodiments, while they can be periodically recalculated, the scores and adjusted scores are maintained (or not recalculated) to prevent a change in a ranking of contacts of the user within a session during which the application is being used by the user.

The plurality of contacts can be a selected number of contacts of the user. For example, the selected number can be all of the contacts of the user on a communications system or a social networking system. As another example, the selected number can be a predetermined number of contacts (e.g., 25 contacts, 100 contacts, 150 contacts, etc.) of the user having the highest scores. As yet another example, the selected number can be a number of contacts that satisfy a threshold score value relating to affinity with the user. Many variations are possible.

The score module 104 can preliminarily order the plurality of contacts based on their scores. The plurality of contacts can be ordered in a ranking. For example, the ranking can be in descending order in which the contact with the highest score is first in the ranking and the contact with the lowest score is last in the ranking.

The ephemeral content promotion module 106 can determine contacts from the plurality of contacts that have posted a selected type of content item that is accessible to the user. In some embodiments, the selected type of content item is an ephemeral content item that has been posted or published by a contact to a communications system or social networking system. As used herein, an ephemeral content item is a content item that is accessible to the user for a limited duration of time. For example, an ephemeral content item can be accessible for a selected duration of time after posting of the ephemeral content item to a communications system or a social networking system. The selected duration of time can be any duration of time (e.g., 24 hours, 48 hours, seven days, etc.). An ephemeral content item can be any type of content item, such as video, audio, images, etc. In some embodiments, an ephemeral content item can be a video (e.g., Story) that, based on applicable privacy rules, is accessible to the user for a predetermined duration of time after posting by a contact of the user. After lapse of the predetermined duration of time after posting, the ephemeral content item expires and is no longer accessible to the user.

The ephemeral content promotion module 106 can determine whether any contacts of the plurality of contacts have posted one or more ephemeral content items that have not expired and remain accessible to the user. The determination of the contacts with such ephemeral content items can be based on, for example, a query of a data store that maintains real time information about the posting, accessibility, and expiration of ephemeral content items associated with users. The ephemeral content promotion module 106 in real time can identify the specific contacts of the user who have "live" (posted and unexpired) ephemeral content items that can be accessed by the user. In some embodiments, for a contact with live ephemeral content items, the ephemeral content promotion module 106 also can determine whether or not the ephemeral content items already have been consumed by the user. When at least a portion of an ephemeral content item has been consumed by the user, the ephemeral content promotion module 106 also can determine the amount of time of the ephemeral content item that has been consumed by the user (e.g., consumption time).

The ephemeral content promotion module 106 can promote (or boost) contacts of the user who have live ephemeral content items so that the contacts potentially appear in a listing of suggested contacts at positions higher than would be warranted by their scores alone. The ephemeral content promotion module 106 can promote such contacts based on a variety of promotion techniques. In some embodiments, the ephemeral content promotion module 106 can perform a first promotion technique. In the first promotion technique, a predetermined total number of suggested contacts that will be presented through the application to the user is determined. The predetermined total number of suggested contacts for presentation can be divided into a predetermined number of segments. The predetermined number of segments can be any selected number of segments. Each segment of the predetermined number of segments can be associated with a number of suggested contacts such that the sum total of the suggested contacts of all segments of the predetermined number of segments is the predetermined total number of suggested contacts. For example, when the predetermined number of segments is three, a first segment can be associated with a first number of suggested contacts; a second segment can be associated with a second number of suggested contacts; and, a third segment can be associated with a third number of suggested contacts. In this example, the sum total of the first number of suggested contacts, the second number of suggested contacts, and the third number of suggested contacts is the predetermined total number of suggested contacts. Many variations in other examples are possible.

In the first promotion technique, the ephemeral content promotion module 106 can select certain contacts of the user who have live ephemeral content items accessible to the user to be included in one or more segments of a predetermined number of segments of a predetermined total number of suggested contacts. The ephemeral content promotion module 106 can select a number of contacts of the user who have the highest scores and who have live ephemeral content items that is equal to the number of suggested contacts associated with the one or more segments. The ephemeral content promotion module 106 can assign this selected number of contacts to appear in the one or more segments. In other words, the highest scoring contacts who have live ephemeral content items are placed into the one or more segments. For the remaining segments, the ephemeral content promotion module 106 can select a number of contacts of the user with the highest scores that is equal to the number of suggested contacts associated with the remaining segments. Likewise, the ephemeral content promotion module 106 can assign this selected number of contacts to be included in the remaining segments. In other words, the highest scoring contacts who do not have live ephemeral content items are placed into the remaining segments.

For example, assume that a predetermined number of segments of a predetermined total number of suggested contacts of a user is selected to be three. The three segments are ordered as a first segment followed by a second segment followed by a third segment. Assume further that the first segment has three suggested contacts; the second segment has three suggested contacts; and, the third segment has three suggested contacts. In this example, the second segment is selected to contain only contacts with live ephemeral content items while the first and third segments can contain any type of contact. The three highest scoring contacts of the user can be selected for the first segment. A contact with live ephemeral content items may potentially appear in the first segment. For the second segment, the three highest scoring contacts with live ephemeral content items can be selected. For the third segment, the next three highest scoring contacts of the user can be selected. A contact with live ephemeral content items may potentially appear in the third segment. In some embodiments, because the second segment is only for highest scoring contacts with live ephemeral content items, a contact in the second segment, which is in a higher position in the listing compared to a contact in the third segment, can have a lower score than a contact in the third segment. In some embodiments, if a contact in a lower segment already appears in a higher segment, the contact can be removed from the lower segment and the next highest scoring contact appropriate for the lower segment can be placed into the lower segment.

The foregoing examples are provided for purposes of illustration and many variations are possible. The predetermined total number of suggested contacts for presentation to the user can be configurable, and appropriately selected for a particular implementation. Further, although the foregoing examples reference three segments into which the predetermined total number of suggested contacts is divided, a different number of segments (e.g., two segments, five segments, etc.) can be selected. In addition, the number of suggested contacts associated with a segment is configurable to be any desired number. In some instances, the number of suggested contacts associated with each segment can be the same or different across one or more segments.

In some embodiments, the ephemeral content promotion module 106 can perform a second promotion technique to adjust the scores of contacts with live ephemeral content items accessible to the user and generate adjusted scores for the contacts. In the second promotion technique, the ephemeral content promotion module 106 can determine a coefficient to be applied to the scores of contacts of the user who have live ephemeral content items. The coefficient can be applied to increase the scores of contacts, thus generating adjusted scores of the contacts. The adjusted scores of the contacts can allow the contacts to be positioned higher in a ranking of the plurality of contacts of the user.

In the second promotion technique, the coefficient in some embodiments can be a real number that has a value greater than one. The coefficient can be multiplied with the score of each contact having a live ephemeral content item accessible to the user so that the adjusted score of the contact is higher than the score of the contact. In this way, the contact with a live ephemeral content item can be boosted in relation to other contacts who do not live ephemeral content items. The value of the coefficient can be configurable based on a particular implementation. In some instances, the value of the coefficient can be determined experimentally based on machine learning. The machine learning model can be trained based on training data including features and labels that are reflective of desired behavior of a user on a communications system or social networking system. For example, the training data can include data associated with user behavior that, when presented with a listing of suggested contacts that includes indications of contacts with live ephemeral content items, selects contacts with live ephemeral content items. As another example, the training data can include data associated with user behavior that, when presented with a listing of suggested contacts that includes indications of contacts with live ephemeral content items, selects a contact with live ephemeral content items and, when presented with a live ephemeral content item, consumes (e.g., watches) the ephemeral content item for at least a threshold duration of time (e.g., two seconds, five seconds, etc.). As yet another example, the training data can include data associated with user behavior that, when presented with a listing of suggested contacts that includes indications of contacts with live ephemeral content items, selects a contact with live ephemeral content items and, when presented with a live ephemeral content item, initiates or continues a messaging thread involving the user and the contact. As yet a further example, the training data can include data associated with user behavior that, when presented with a listing of suggested contacts that includes indications of contacts with live ephemeral content items, selects a contact with live ephemeral content items and, when presented with a live ephemeral content item, provides an emoji in response to the live ephemeral content item. Different values of coefficients can be considered in various experiments based on the machine learning model. A value of the coefficient that achieves a highest probability of desired user behavior can be selected. As referenced, the value of the coefficient can be applied to the scores of contacts with live ephemeral content items. Contacts with live ephemeral content items and contacts without live ephemeral content items can be considered together in a ranking based on their respective adjusted scores and unadjusted scores (which are referred to as simply "scores"). Based on the ranking, the highest ranking contacts can be selected as the predetermined total number of suggested contacts for presentation. Many variations are possible. The foregoing examples of promotion techniques are illustrations. Other promotion techniques can be used in accordance with the present technology.

The suggestions module 108 can cause presentation of a listing of suggested contacts of the user through an interface of the application. The listing can contain a predetermined total number of suggested contacts for presentation. The suggestions module 108 can determine an organization or ordering of contacts in the listing of suggested contacts. The appearance of contacts in the listing of suggested contacts can be based at least in part on the promotion technique used to boost contacts of the user with live ephemeral content items.

For example, the suggestions module 108 can generate a listing of suggested contacts based on the first promotion technique. The listing of suggested contacts can be based on a predetermined number of segments of a predetermined total number of suggested contacts for presentation. Further, each segment of the predetermined number of segments can include an associated number of suggested contacts. As discussed, a selected number of contacts of the user with live ephemeral content items and with the highest scores can appear in one or more segments that contain only contacts with live ephemeral content items.

As another example, the suggestions module 108 can generate a listing of suggested contacts based on the second promotion technique. The listing can contain a predetermined total number of suggested contacts for presentation. The listing of suggested contacts can be based in part on the adjusted scores of contacts having live ephemeral content items accessible to the user and scores of the other contacts. The listing can include the contacts with the highest rankings from a ranking of both contacts with live ephemeral content items and contacts without live ephemeral content items. The contacts can appear in the listing in an order based on their scores and adjusted scores. In other examples, the suggestions module 108 can generate a listing of suggested contacts in other manners that are different from the examples described.

The suggestions module 108 can cause presentation of the listing of suggested contacts through the interface of the application. In some embodiments, the listing of suggested contacts can be oriented as a vertical listing. The listing of suggested contacts can include a section dedicated for each contact in the listing. For example, the section can be the area of a row associated with the contact. The rows associated with the contacts can be arranged in a stacked manner to constitute the presentation of the listing of suggested contacts. The section can include one or more identifiers that identify the corresponding contact. The section also can include one or more elements that convey information about the contact. The elements can include indications about the status of the contact or content items associated with the contact.

In some embodiments, the suggestions module 108 can generate a section associated with a contact of a user to include an avatar or other representation of the contact, the name of the contact, and a displayable indication that an ephemeral content item of the contact is currently accessible to the user. The indication that the ephemeral content item of the contact is currently accessible to the user can be represented in the section in a variety of manners. For example, the indication can be a geometric shape, such as a circle, that encompasses the avatar of the contact. In some examples, the indication can be located within a threshold distance from the position of the avatar of the contact in the section. In some embodiments, when the ephemeral content item of the contact has not been consumed by the user or has not been consumed by the user for a threshold duration of time, the indication can be presented in a first color, such as blue or any other desired color. In some embodiments, when the ephemeral content item of the contact has been consumed by the user or has been consumed by the user for the threshold duration of time, the indication can be presented in a second color, such as grey or another desired color that is different from the first color. In some embodiments, different mechanisms apart from color can be used to indicate to the user that the ephemeral content item has been accessed or has not been accessed by the user. The different mechanisms can include any pair of distinctive references, such as two different shading (darkness) levels of a geometric shape, two different geometric shapes, the presence of a reference (e.g., icon) and the absence of the reference, etc. Many variations are possible.

In some embodiments, the suggestions module 108 can integrate, juxtapose, or otherwise combine an indication that conveys the accessibility by the user of an ephemeral content item with other types of indications. For example, the suggestions module 108 can combine an indication that conveys the accessibility by the user of an ephemeral content item of a contact with an indication that the contact is actively using the application through which the listing of suggested contacts is being presented. For instance, an indication that conveys the accessibility by the user of an ephemeral content item of a contact can be represented as a circle around an avatar of the contact. An indication that the contact is actively using the application can be represented through a reference, such as a prominent dot. The suggestions module 108 can generate a combined indication as a circle around the avatar of the contact with the circle truncated to permit the appearance of the dot.

As another example, an indication that conveys the accessibility by the user of an ephemeral content item of a contact can be combined with an indication that the contact was at a certain past duration of time previously using the application through which the listing of suggested contacts is being presented. For instance, an indication that conveys the accessibility by the user of an ephemeral content item of a contact can be represented as a circle around an avatar of the contact. An indication that the contact was at a certain past duration of time previously using the application can be represented through a reference, such as a statement of time when the contact was last using the application (e.g., "40m"). The suggestions module 108 can generate a combined indication as a circle around the avatar of the contact that is truncated to permit the appearance of the statement of time.

The suggestions module 108 can present the listing of suggested contacts through the interface of the application for potential selection by the user. In response to the selection of a contact in the listing that is associated with an indication that the contact has live ephemeral content items accessible to the user, the suggestions module 108 can present different views of the interface to the user. For example, if the user selects a contact by a touch gesture applied to the avatar of the contact or applied to the indication that the contact has accessible live ephemeral content items, or at a position within a threshold distance from the avatar or the indication, the suggestions module 108 can cause presentation of the ephemeral content item to the user through the interface. While the ephemeral content item is being presented, the interface can include options to send a message in response to the ephemeral content item or react to the ephemeral content item with one or more emojis. When the ephemeral content item concludes playing or if the user cancels playing of the ephemeral content item, the suggestions module 108 can return to presentation of the listing of suggested contacts with the previously selected contact now shown with an indication that the ephemeral content item has been consumed by the user. If the user selects a contact by a touch gesture applied to the name of the contact, or at a position within a threshold distance from the name of the contact, the suggestions module 108 can display a new message thread (messaging session) or a preexisting message thread between the user and the contact to allow them to communicate with one another through messaging.

Figure 2:
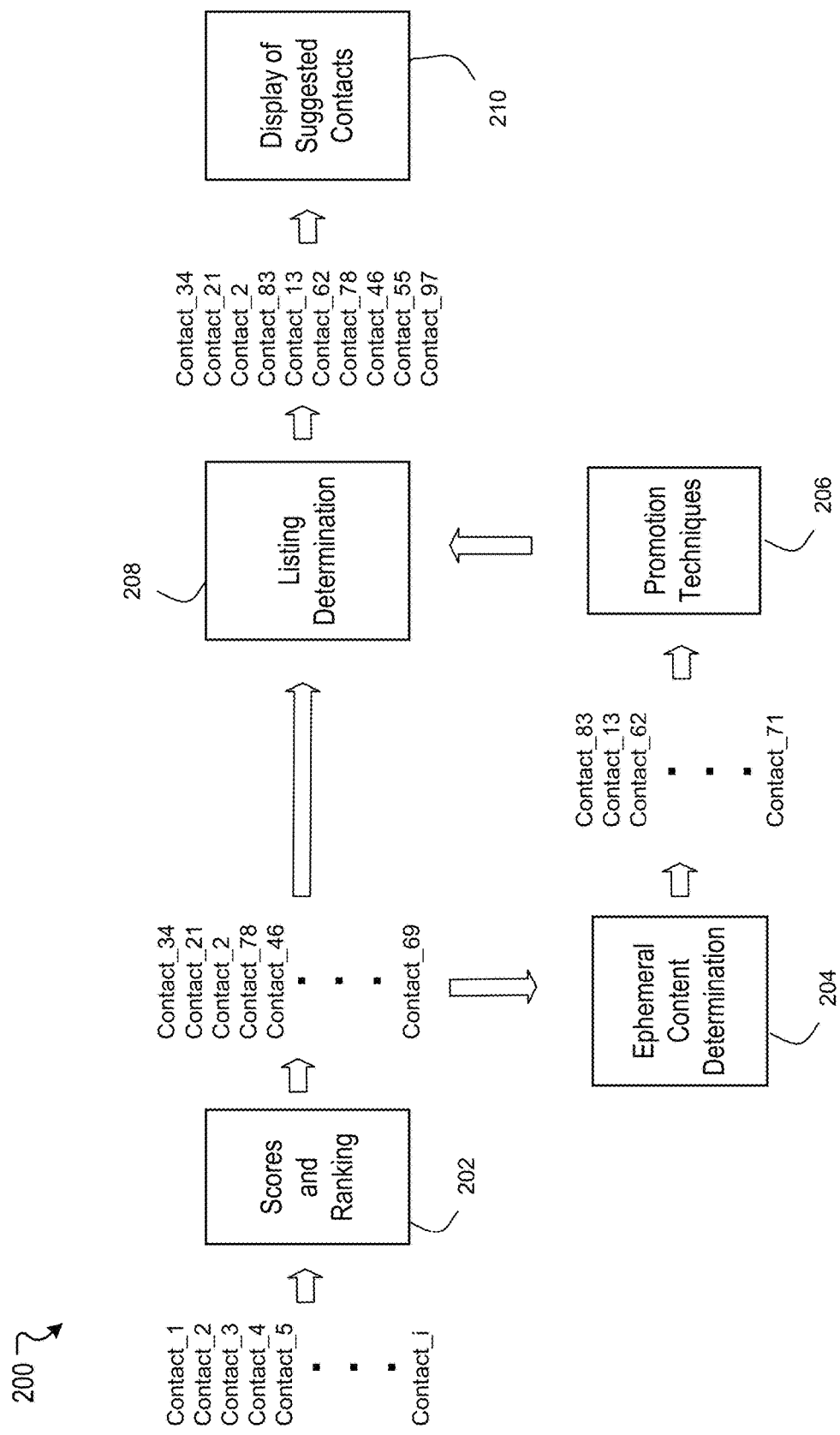
FIG. 2 illustrates an example functional block diagram, according to an embodiment of the present technology.

FIG. 2 illustrates an example functional block diagram 200, according to an embodiment of the present technology. In some embodiments, the functionality of the block diagram 200 can be implemented or performed by the content module 102. The functional block diagram 200 illustrates the generation of a listing of suggested contacts, including contacts with live ephemeral content items, to be presented to a user of an application associated with a messaging system or a social networking system. A set of contacts of a user (e.g., Contact_1, Contact_2, Contact_3, Contact_4, Contact_5, . . . , Contact_i as shown) can have any desired number of contacts. The set of contacts can be, for example, entities known by the user on the messaging system or the social networking system. At 202, scores for the set of contacts are obtained or determined. Each score of a contact can be a value representing a degree of relationship or affinity between the user and the contact. For example, a score may indicate a likelihood that the user will intend to communicate with the contact or a predicted degree to which the user may wish to communicate with the contact. Based on their scores, a preliminary ranking of the set of contacts can be performed and the set of contacts can be ordered based on the ranking (e.g., Contact_34, Contact_21, Contact_2, Contact_78, Contact_46, . . . , Contact_69 as shown). At 204, it is determined which of the contacts of the user have ephemeral content items that are currently accessible to the user. For example, as the user is accessing a search utility of the application, it can be determined in real time which contacts of the user have live ephemeral content items which the user can currently consume. The contacts with live ephemeral content items (e.g., Contact_83, Contact_13, Contact_62, . . . , Contact_71 as shown) can be boosted so that they will be included or will be more likely to be included in the listing of suggested contacts.

At 206, a promotion technique is applied to the contacts with live ephemeral content items. For example, a selected number of such contacts having the highest scores can be identified for placement in a particular, dedicated segment in the listing of suggested contacts. As another example, the scores of contacts with live ephemeral content items can be multiplied by a selected coefficient to generate higher, adjusted scores for the contacts. At 208, the listing of suggested contacts is generated. In a first example, the listing of suggested contacts can include a plurality of segments of which one dedicated segment includes only contacts with live ephemeral content items. The contacts with live ephemeral content items in the dedicated segment can have the highest scores of all contacts with live ephemeral content items, subject to any possible contacts with live ephemeral content items with even higher scores in a segment higher than the dedicated segment. In a second example, a predetermined number of contacts are included in the listing of suggested contacts. The predetermined number of contacts are determined by a ranking of the contacts based on their scores or adjusted scores, as applicable. With respect to the first example, the listing of suggested contacts as determined (e.g., Contact_34, Contact_21, Contact_2, Contact_83, Contact_13, Contact_62, Contact_78, Contact_46, Contact_55, Contact_97 as shown) can contain contacts with live ephemeral content items when such contacts are placed into a dedicated segment of the listing. With respect to the second example, the listing of suggested contacts as determined (e.g., Contact_34, Contact_21, Contact_2, Contact_83, Contact_13, Contact_62, Contact_78, Contact_46, Contact_55, Contact_97 as shown) can contain contacts with live ephemeral content items because such contacts have higher adjusted scores resulting from a boost provided by the selected coefficient.

At 210, the listing of suggested contacts is presented through an interface of the application to the user. Display of a contact with a live ephemeral content item in the listing can be associated with a displayed indication to signify that a live ephemeral content item of the contact is accessible by the user. For example, the indication can be a circle in a first color around an avatar of the contact. In response to selection by the user of the avatar or the indication, the ephemeral content item can be played for the user. At the conclusion of playback of the ephemeral content item, the interface can present the circle around the avatar of the contact now in a second color to convey that the ephemeral content item has been consumed by the user.

Figure 3A:
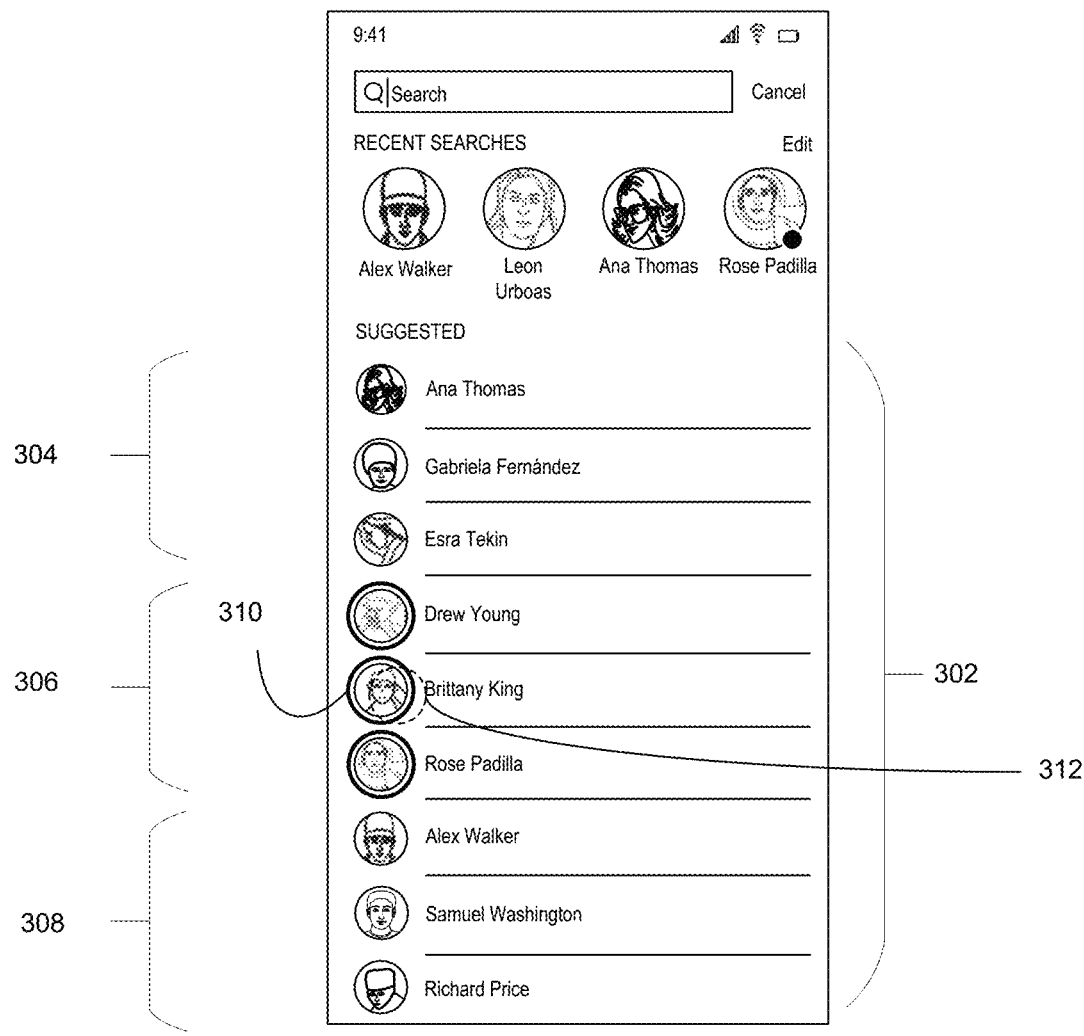
FIG. 3A illustrates an example view of an interface, according to an embodiment of the present technology.
Figure 3B:
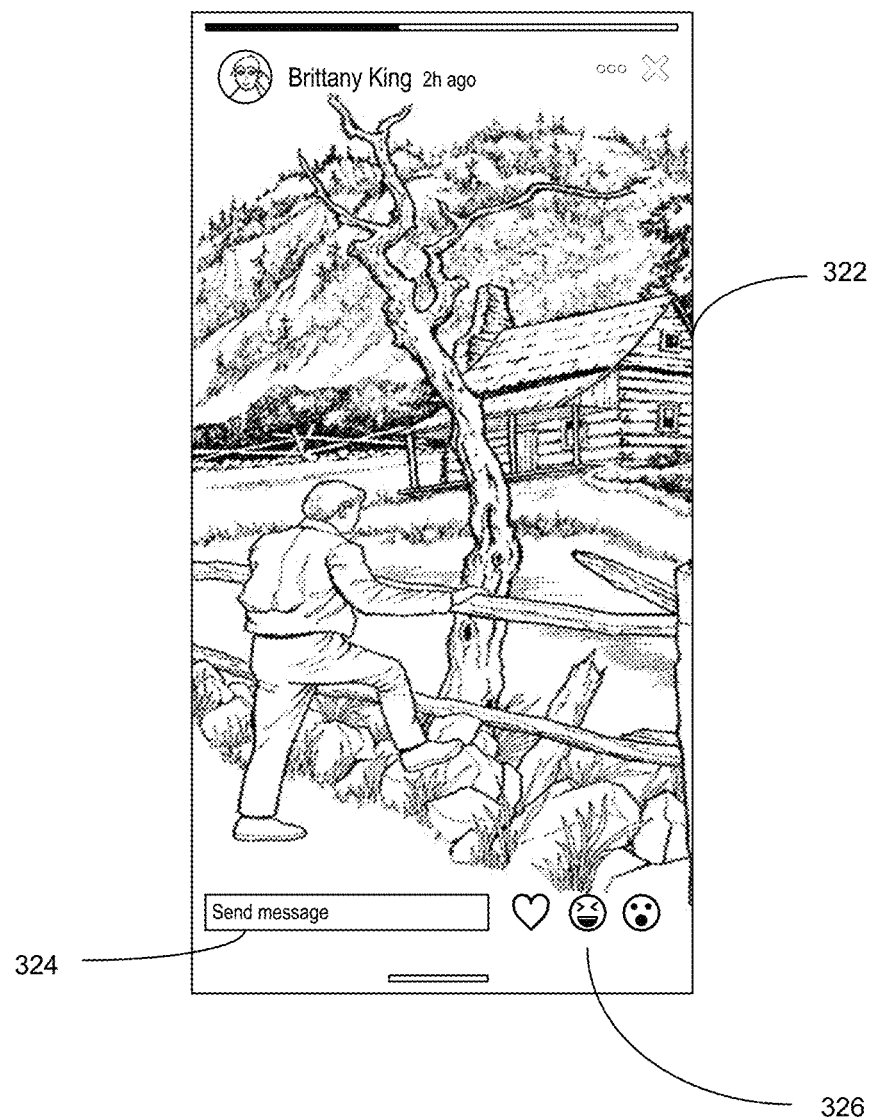
FIG. 3B illustrates an example view of an interface, according to an embodiment of the present technology.
Figure 3C:
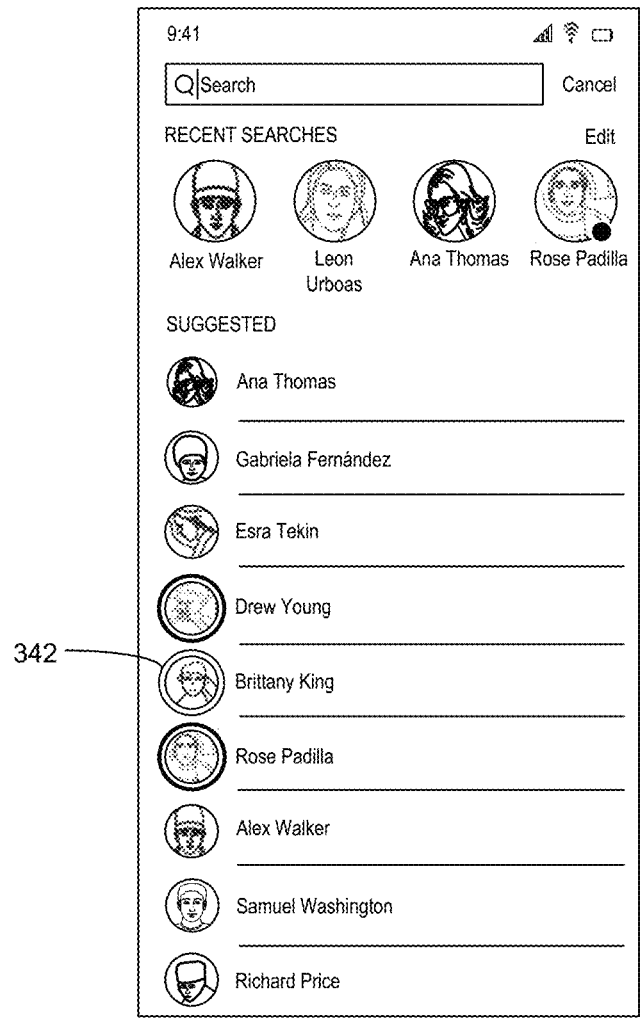
FIG. 3C illustrates an example view of an interface, according to an embodiment of the present technology.
Figure 3D:
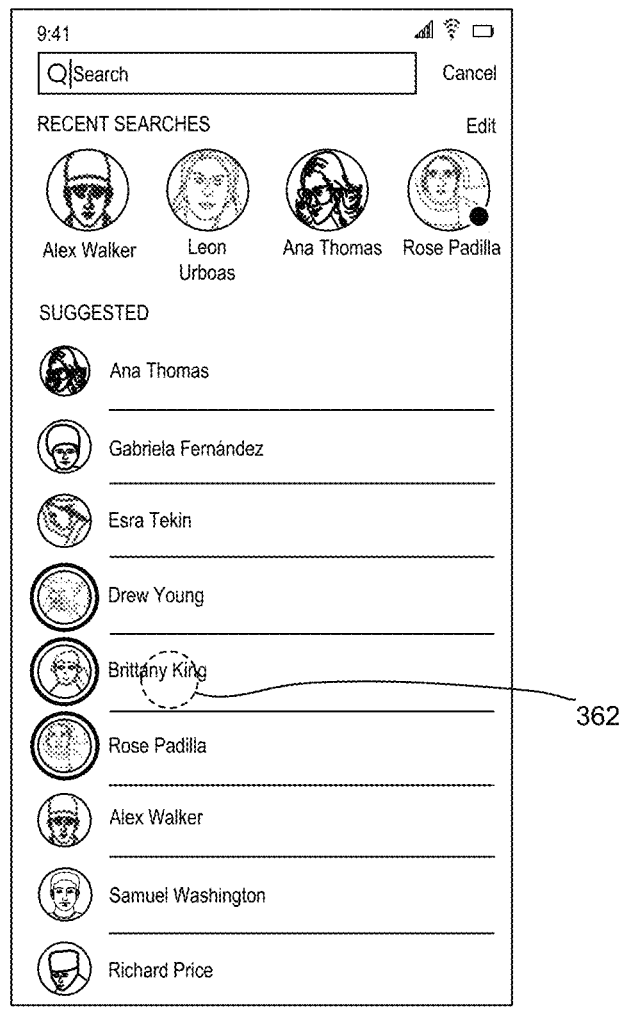
FIG. 3D illustrates an example view of an interface, according to an embodiment of the present technology.
Figure 3E:
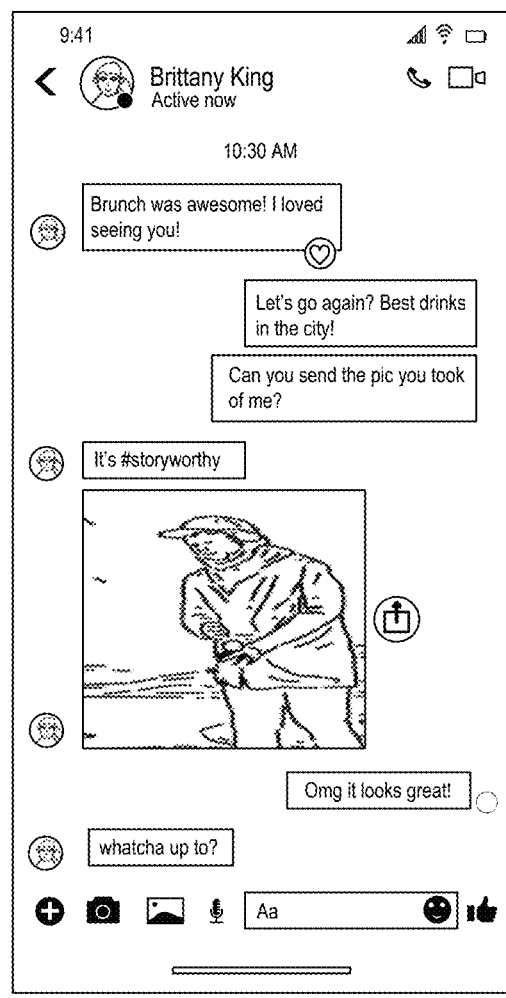
FIG. 3E illustrates an example view of an interface, according to an embodiment of the present technology.
Figure 4:
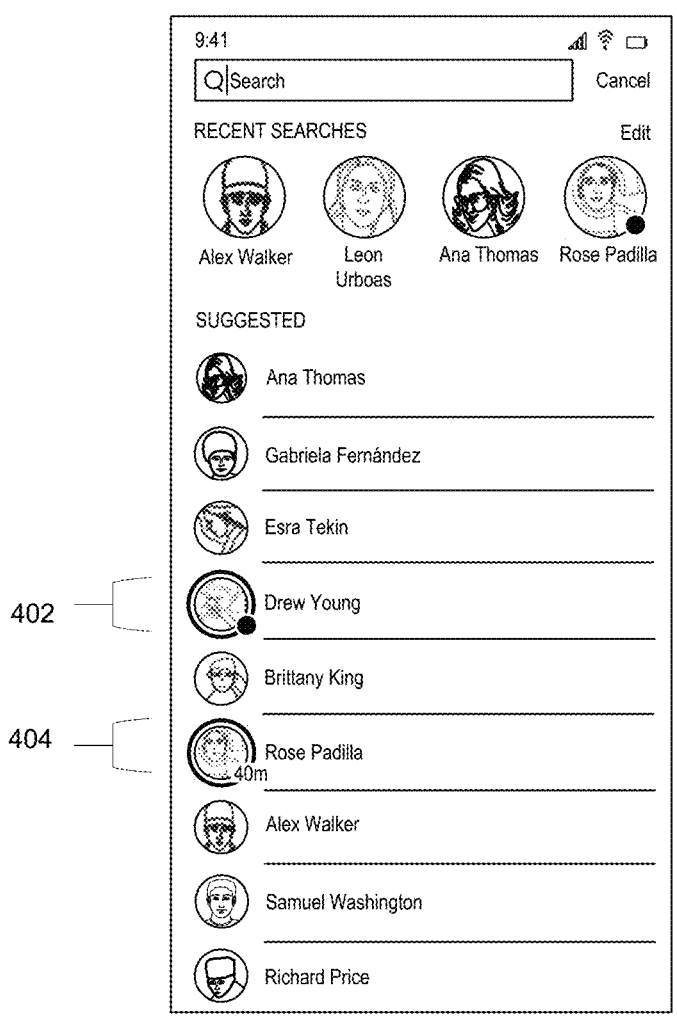
FIG. 4 illustrates an example view of an interface, according to an embodiment of the present technology.

FIGS. 3A-4 illustrate example views of an interface of an application that can be presented through a screen of a computing device of a user, according to an embodiment of the present technology. In some embodiments, the views of the interface can be generated by the content module 102 and the design and operation of the interface can be consistent with the described functionality of the content module 102. As mentioned, the functionality of the content module 102 can be implemented in whole or in part on a server system or on an application running on a computing device of a user.

In FIG. 3A, a view 300 of the interface of the application is presented to the user. The interface can be a surface or entry point through which the user can perform searches for contacts of the user, such as a search screen as shown. After the user interacts with a search utility by, for example, touching a search box to enter a search term, a listing of suggested contacts 302 appears in the interface. The listing of suggested contacts 302 includes various segments. In the example shown, the listing of suggested contacts 302 contains a first segment 304, a second segment 306, and a third segment 308. The second segment 306 is dedicated to contacts of the user with live ephemeral content items (i.e., Drew Young, Brittany King, Rose Padilla). The second segment 306 has three positions for contacts with live ephemeral content items. Accordingly, the three contacts with live ephemeral content items and with the highest scores (subject to any contacts with live ephemeral content items and even higher scores that may appear in the first segment 304) have been selected to be included in the second segment 306. A section in the interface associated with each contact with live ephemeral content items displays an avatar of the contact, an indication 310 that a live ephemeral contact item of the contact is accessible to the user, and the name of the contact. In the example shown, the indication 310 is a circle in a first color (e.g., blue) around the avatar of the contact. For example, the section for Brittany King includes a circle as the indication 310 encompassing an avatar of Brittany King. When the user applies a gesture 312 on screen where the avatar or the indication 310 associated with Brittany King is displayed, the ephemeral content item of Brittany King will be provided to the user.

In the example shown, unlike the second segment 306, the first segment 304 and the third segment 308 are not intended to include contacts with live ephemeral content items exclusively. The contacts appearing in the first segment 304 and the third segment 308 can be contacts with the highest scores, whether or not the contacts have live ephemeral content items. The contacts appearing in the first segment 304 and the third segment 308 can be ordered in the first segment 304 and the third segment 308 based on their scores. As shown, the absence of indications around avatars of the contacts appearing in the first segment 304 and the third segment 308 signifies that these contacts do not have live ephemeral content items that are currently accessible to the user.

In FIG. 3B, a view 320 of the interface can be presented in response to application of the gesture 312 on the screen where the avatar or the indication 310 associated with Brittany King is displayed. The interface plays for the user an ephemeral video 322 (e.g., Story) posted by Brittany King. The interface includes a text box 324 to allow the user to author a message in response to the ephemeral video 322. The interface also includes emojis 326 that can be selected by the user to react to the ephemeral video 322.

In FIG. 3C, a view 340 of the interface can be presented in response to conclusion of playback of the ephemeral video 322. For example, the user may have watched the ephemeral video 322 to its end or the user may have taken an action to exit after watching the ephemeral video 322 for at least a threshold duration of time. As a result, the interface returns to the search screen including the listing of suggested contact that was previously displayed. The contact Brittany King, like the other contacts in the listing of suggested contacts 302, has maintained her position in the listing. However, the indication 310 has changed to an indication 342 to convey that, while the ephemeral video 322 is still accessible to the user, the ephemeral video 322 already has been watched by the user. As shown, like the indication 310, the indication 342 is a circle around the avatar of Brittany King. However, the indication 342 is a circle in a second color (e.g., grey) to indicate that the ephemeral video 322 has been watched by the user. In other examples (not shown), the indication 310 and the indication 342 can be elements other than colored circles.

In FIG. 3D, a view 360 of the interface largely mirrors the view 300. Instead of the user providing a gesture to the avatar of Brittany King or the associated indication 310 of an accessible live ephemeral content item, the user can apply a gesture 362 on the screen where the name of Brittany King is displayed. In response to application of the gesture 362 on the name of Brittany King, a message thread with Brittany King is displayed to the user.

In FIG. 3E, a view 380 of the interface can be presented in response to application of the gesture 362 on the name of a contact (e.g., Brittany King). The interface presents a message thread 382 to allow the user to conduct communications with the contact through messaging.

In FIG. 4, a view 400 of the interface can be presented to display various types of status information regarding contacts of the user in the listing of suggested contacts 302. The status information can include combinations of indications. For example, the interface can include a combined indication 402 that conveys the accessibility of an ephemeral content item and that conveys the contact is currently using the application. In this example, the combined indication 402 is a circle around the avatar of a contact that is truncated to permit the appearance of a dot to indicate that the contact is currently using the application. As another example, the interface can include a combined indication 404 that conveys the accessibility by the user of an ephemeral content item of a contact and that conveys the contact was at a certain past duration of time previously using the application. In this example, the combined indication 404 is a circle around the avatar of a contact that is truncated to permit the appearance of a statement of time when the contact last used the application.

Figure 5:
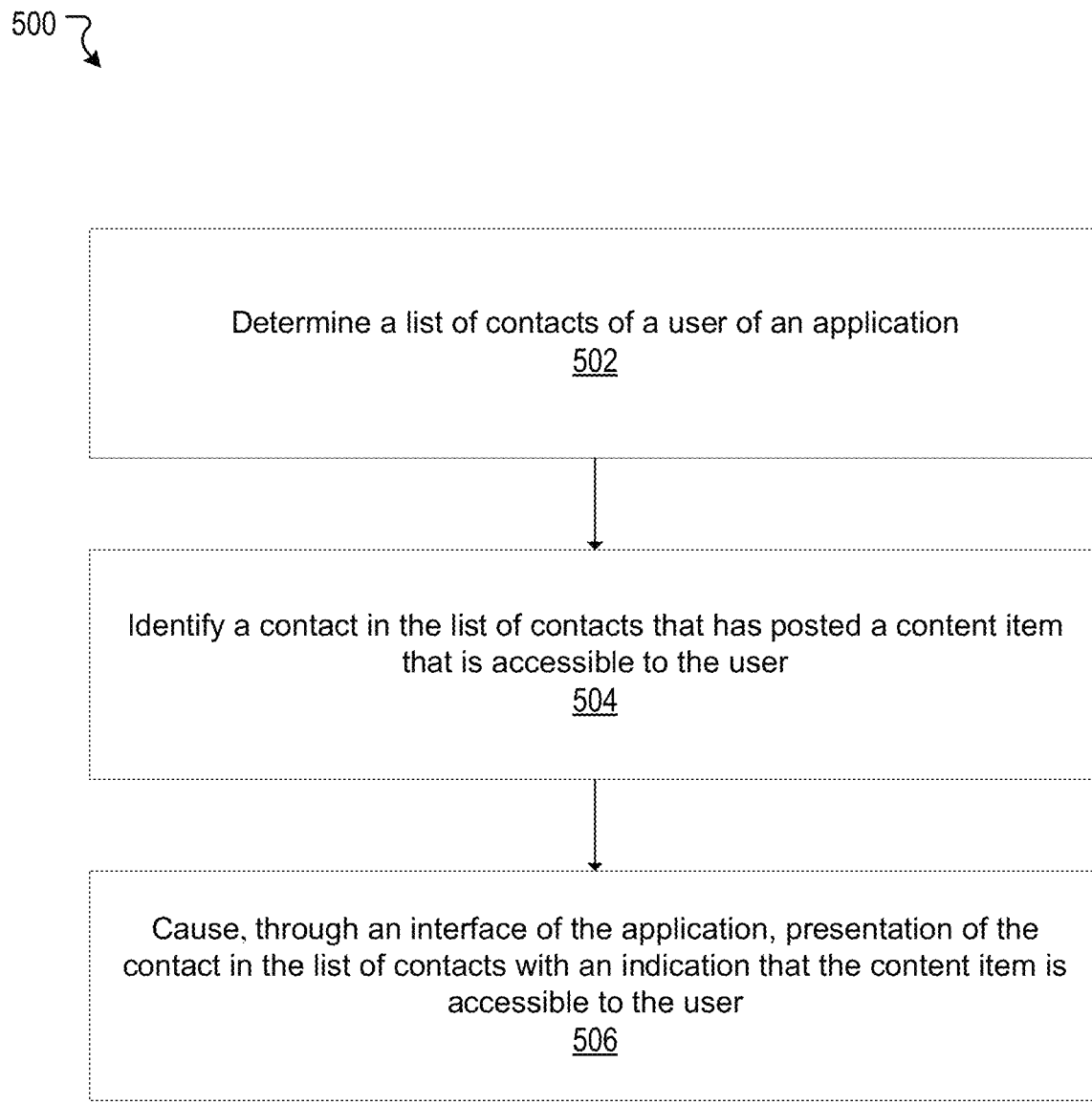
FIG. 5 illustrates an example method, according to an embodiment of the present technology.

FIG. 5 illustrates an example method 500, according to an embodiment of the present technology. It should be understood that there can be additional, fewer, or alternative steps performed in similar or alternative orders, or in parallel, based on the various features and embodiments discussed herein unless otherwise stated. At block 502, the method 500 can determine a list of contacts of a user of an application. At block 504, the method 500 can identify a contact in the list of contacts that has posted a content item that is accessible to the user. At block 506, the method 500 can cause, through an interface of the application, presentation of the contact in the list of contacts with an indication that the content item is accessible to the user.

It is contemplated that there can be many other uses, applications, and/or variations associated with the various embodiments of the present technology. For example, in some cases, a user can choose whether or not to opt-in to utilize the present technology. The present technology can also ensure that various privacy settings and preferences are maintained and can prevent private information from being divulged. In another example, various embodiments of the present technology can learn, improve, and/or be refined over time.

Social Networking System—Example Implementation

Figure 6:
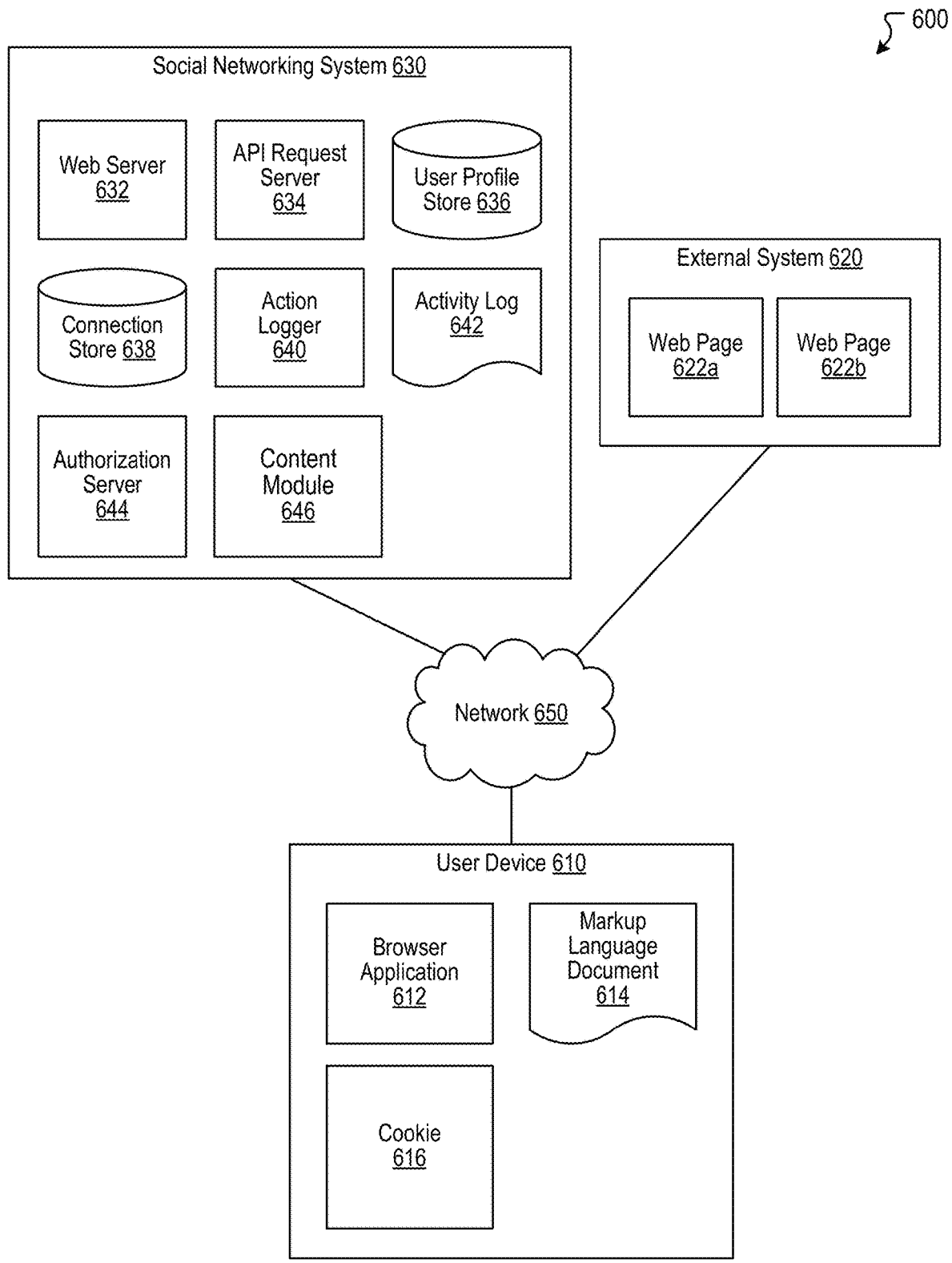
FIG. 6 illustrates a network diagram of an example system including an example social networking system, according to an embodiment of the present technology.

FIG. 6 illustrates a network diagram of an example system 600 that can be utilized in various scenarios, according to an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual", but connections may also be unilateral, or "one-way". For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content module 646. The content module 646 can be implemented with the content module 102, as discussed in more detail herein. In various embodiments, some or all functionality of the content module 102 can be additionally or alternatively implemented by the user device 610. It should be appreciated that there can be many variations or other possibilities.

Hardware Implementation

Figure 7:
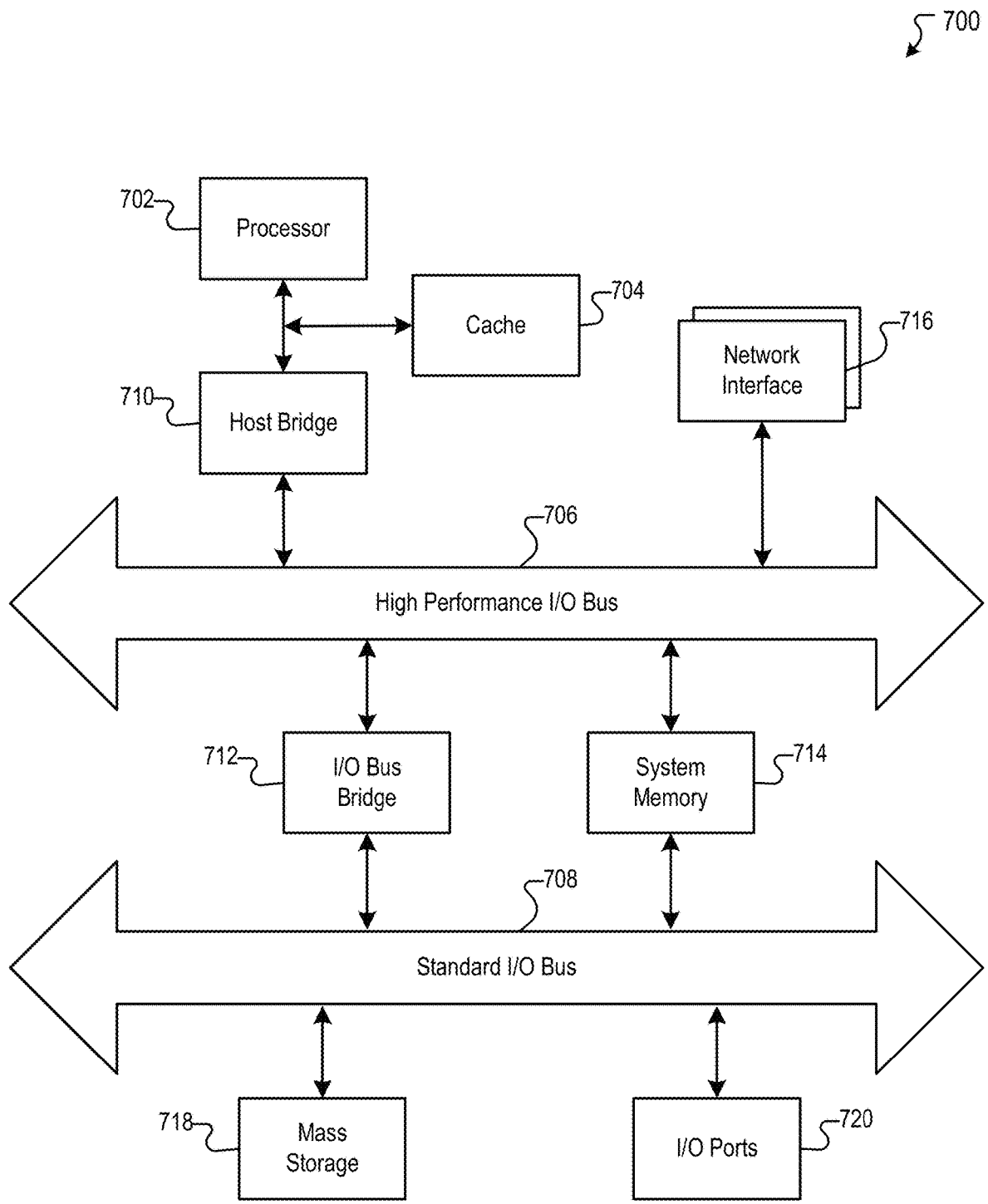
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, California, and the x86-compatible processors manufactured by Advanced Micro Devices (AMD), Inc., of Sunnyvale, California, as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the present technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, a list of contacts of a user of an application, wherein contacts in the list of contacts are ordered based on scores associated with the contacts;
   identifying, by the computing system, a first contact in the list of contacts that has posted a first content item that is accessible to the user, wherein the first contact is associated with a first score lower than a second score associated with a second contact, wherein the second contact has not posted a second content item that is accessible to the user, and wherein the first contact is ordered higher than the second contact based on the first content item; and causing, by the computing system, through an interface of the application, presentation of the first contact in the list of contacts with an indication that the first content item is accessible to the user.

2. The computer-implemented method of claim 1, wherein the first content item is an ephemeral content item.

3. The computer-implemented method of claim 1, wherein the indication is an element in a predetermined position in relation to an identifier of the first contact.

4. The computer-implemented method of claim 3, wherein the element has a geometric shape that is displayed in a first color when the first content item has not been consumed by the user and displayed in a second color when the first content item has been consumed by the user.

5. The computer-implemented method of claim 1, wherein the presentation of the first contact includes an avatar associated with the first contact, and selection by the user of at least one of the avatar or the indication causes provision of the first content item.

6. The computer-implemented method of claim 1, wherein the presentation of the first contact includes a name of the first contact, and selection by the user of the name causes provision of a message thread between the user and the first contact.

7. The computer-implemented method of claim 1, wherein the first contact appears in a first predetermined segment of the list of contacts that only contains contacts with content items that are accessible to the user.

8. The computer-implemented method of claim 1, further comprising:

causing, by the computing system, through the interface of the application, removal of the indication that the first content item is accessible to the user based on a determination that the first content item was consumed by the user.

9. The computer-implemented method of claim 1, wherein an adjusted score is generated for the first contact based on application of a coefficient to the first score associated with the first contact, the first contact appearing in the list of contacts based on the adjusted score.

10. The computer-implemented method of claim 1, wherein the indication is part of a combined indication that the first contact has a content item that is accessible to the user and that the first contact is currently using the application.

11. A system comprising:

at least one processor; and a memory storing instructions that, when executed by the at least one processor, cause the system to perform operations comprising:

determining a list of contacts of a user of an application, wherein contacts in the list of contacts are ordered based on scores associated with the contacts;

identifying a first contact in the list of contacts that has posted a first content item that is accessible to the user, wherein the first contact is associated with a first score lower than a second score associated with a second contact, wherein the second contact has not posted a second content item that is accessible to the user, and wherein the first contact is ordered higher than the second contact based on the first content item; and causing through an interface of the application, presentation of the first contact in the list of contacts with an indication that the first content item is accessible to the user.

12. The system of claim 11, wherein the first content item is an ephemeral content item.

13. The system of claim 11, wherein the indication is an element in a predetermined position in relation to an identifier of the first contact.

14. The system of claim 13, wherein the element has a geometric shape that is displayed in a first color when the first content item has not been consumed by the user and displayed in a second color when the first content item has been consumed by the user.

15. The system of claim 11, wherein the presentation of the first contact includes an avatar associated with the first contact, and selection by the user of at least one of the avatar or the indication causes provision of the first content item.

16. A non-transitory computer-readable storage medium including instructions that, when executed by at least one processor of a computing system, cause the computing system to perform operations comprising:

determining a list of contacts of a user of an application, wherein contacts in the list of contacts are ordered based on scores associated with the contacts;

identifying a first contact in the list of contacts that has posted a first content item that is accessible to the user, wherein the first contact is associated with a first score lower than a second score associated with a second contact, wherein the second contact has not posted a second content item that is accessible to the user, and wherein the first contact is ordered higher than the second contact based on the first content item; and causing through an interface of the application, presentation of the first contact in the list of contacts with an indication that the first content item is accessible to the user.

17. The non-transitory computer-readable storage medium of claim 16, wherein the first content item is an ephemeral content item.

18. The non-transitory computer-readable storage medium of claim 16, wherein the indication is an element in a predetermined position in relation to an identifier of the first contact.

19. The non-transitory computer-readable storage medium of claim 18, wherein the element has a geometric shape that is displayed in a first color when the first content item has not been consumed by the user and displayed in a second color when the first content item has been consumed by the user.

20. The non-transitory computer-readable storage medium of claim 16, wherein the presentation of the first contact includes an avatar associated with the first contact, and selection by the user of at least one of the avatar or the indication causes provision of the first content item.

* * * * *